(12) United States Patent
Knote et al.

(10) Patent No.: US 9,101,125 B2
(45) Date of Patent: Aug. 11, 2015

(54) HEAT CHAMBER FOR TERMINATION OF BED BUGS AND OTHER ARTHROPODS

(71) Applicants: Elizabeth Knote, Cape Girardeau, MO (US); Philip G. Koehler, Gainesville, FL (US); Roberto M. Pereira, Gainesville, FL (US); Wayne Walker, Gainesville, FL (US)

(72) Inventors: Elizabeth Knote, Cape Girardeau, MO (US); Philip G. Koehler, Gainesville, FL (US); Roberto M. Pereira, Gainesville, FL (US); Wayne Walker, Gainesville, FL (US)

(*) Notice: Subject to any disclaimer, the term of this patent is extended or adjusted under 35 U.S.C. 154(b) by 192 days.

(21) Appl. No.: 13/986,134

(22) Filed: Apr. 4, 2013

(65) Prior Publication Data

US 2013/0276358 A1    Oct. 24, 2013

Related U.S. Application Data

(60) Provisional application No. 61/686,525, filed on Apr. 6, 2012.

(51) Int. Cl.
| | |
|---|---|
| *E04H 15/12* | (2006.01) |
| *A01M 1/24* | (2006.01) |
| *A01M 1/20* | (2006.01) |

(52) U.S. Cl.
CPC .............. *A01M 1/2094* (2013.01); *A01M 1/24* (2013.01); *E04H 15/12* (2013.01)

(58) Field of Classification Search
CPC ......... E04H 15/02; E04H 15/10; E04H 15/12; E04H 15/18; E04H 15/54; E04H 4/108; E04H 2015/207; A01M 1/023; A01M 1/00; A01M 1/24; A01M 1/2033

USPC ......... 135/91–92, 96, 97, 121, 156, 115, 119, 135/907; 43/124, 132.1, 144; 52/63, 83, 52/202, 1, 2.22–2.24, 79.5

See application file for complete search history.

(56) References Cited

U.S. PATENT DOCUMENTS

| | | | | |
|---|---|---|---|---|
| 3,419,915 | A | * | 1/1969 | Clark, Jr. .......................... 4/526 |
| 4,219,036 | A | * | 8/1980 | Biggs .............................. 135/93 |
| 4,232,489 | A | * | 11/1980 | Corvington et al. .............. 52/63 |
| 4,817,329 | A | | 4/1989 | Forbes |
| 5,019,849 | A | * | 5/1991 | Harrison ....................... 396/592 |
| 5,058,313 | A | | 10/1991 | Tallon |
| 5,331,991 | A | * | 7/1994 | Nilsson ........................... 135/93 |
| 5,542,489 | A | | 8/1996 | Allison et al. |
| 5,635,397 | A | | 6/1997 | Futschik et al. |
| 5,974,902 | A | | 11/1999 | Scofield |
| 6,005,404 | A | | 12/1999 | Cochran et al. |
| 6,141,901 | A | | 11/2000 | Johnson et al. |

(Continued)

OTHER PUBLICATIONS

Roberto Pereira, et al, Lethal Effects of Heat and Use of Localized Heat Treatment for Controlof BedBug Infestation,Journal ofEconomic Entomolgy,2009,p. 1182-1188,vol. 102,No. 3.

(Continued)

*Primary Examiner* — Winnie Yip
(74) *Attorney, Agent, or Firm* — Paul M Denk (57) ABSTRACT

A system to heat objects which are infested with arthropods is disclosed having a structured shelter, composed of two double reflective canopies and a double reflective floor cover. Heaters are placed within the shelter, and a fan is located behind the heater to furnish hot air circulation. Thermocouples are provided to determine the heating end point. The non metallic support structure is installed around the objects to be heated, and the various reflective covers and canopies are installed upon the support structure.

20 Claims, 10 Drawing Sheets

(56) References Cited

U.S. PATENT DOCUMENTS

| | | |
|---|---|---|
| 6,327,812 B1 | 12/2001 | Hedman et al. |
| 6,892,491 B2 | 5/2005 | Hedman |
| 7,304,264 B2 | 12/2007 | Roy |
| 7,578,306 B2 * | 8/2009 | Mettavant ............... 135/126 |
| 7,690,148 B2 | 4/2010 | Hedman |
| 8,549,794 B2 * | 10/2013 | Hotes ............... 52/63 |
| 8,742,296 B2 * | 6/2014 | Bermudez ............... 219/385 |
| 2003/0216041 A1 | 11/2003 | Herring et al. |
| 2005/0028965 A1 | 2/2005 | Chen |
| 2005/0224492 A1 | 10/2005 | Roy |
| 2006/0213546 A1 * | 9/2006 | Mitsui et al. ............... 135/121 |
| 2007/0175232 A1 | 8/2007 | Schultz et al. |
| 2011/0289825 A1 * | 12/2011 | James ............... 43/132.1 |
| 2012/0012046 A1 | 1/2012 | Cain |
| 2012/0216444 A1 * | 8/2012 | Raud et al. ............... 43/132.1 |
| 2013/0269239 A1 * | 10/2013 | Whitley et al. ............... 43/132.1 |
| 2014/0013653 A1 * | 1/2014 | Lander ............... 43/132.1 |

OTHER PUBLICATIONS

Krissie Callahan, Steritech's New Sleepeasy Thermal Chamber, Nov. 12, 2010, The Steritech Group.

* cited by examiner

HEAT CHAMBER FOR TERMINATION OF BED BUGS AND OTHER ARTHROPODS

CROSS REFERENCE TO RELATED APPLICATION

This non-provisional patent application claims priority to the provisional patent application having Ser. No. 61/686,525, filed on Apr. 6, 2012.

FIELD OF THE INVENTION

This invention relates to the termination and destruction of insects on isolated items through the use of heat.

BACKGROUND OF THE INVENTION

Arthropods such as cockroaches, carpet beetles, clothes moths, cigarette beetles, drug store beetles, fleas, wood destroying organisms, bed bugs, lice, house dust mites, etc. are known to infest furniture and other household objects. (This list does contain the entire list of affected arthropods). The most notorious of these, bed bugs, *Cimex lectularius* L., have been associated with humans for at least the past 3500 years (Panagio-takopulu). After a decline in bed bug populations in developed countries after World War II (Kruger 299, Gangloff-Kaufman and Schultz 2003), a resurgence of these blood sucking insects have been causing increasing problems (Pinto et al. 2007). Because these insects hide in cracks and crevices (Ursinger 1966), detection (Cooper and Harlan 2004), and control can be challenging. This is especially true when bed bug aggregations occur on beds, furniture, and other objects where the application of chemical pesticides may cause problems both for the pest control industry and for customers not willing to accept close contact with pesticides.

Thus a physical control method applied to the room contents should be useful as a tool, in the overall management of arthropod infestations as a supplement to crack and crevice insecticidal applications to potential harborages Heat treatment of a whole room or building is currently used for control of Bed Bugs (Kells 2006, Pinto et al. 2007) as well as many other insects especially storage pests (Tang it al. 2007). Temperatures between 44 and 45 C (Doggett et al. 2006) have been cited repeatedly as lethal to bed bugs.

Heat treatments varying from whole structure to whole room to containerized treatments have been used by the pest control industry (Pinto et al. 2007) reportedly with positive results. However, the use of solar radiation as a heat source to kill bed bugs in encased mattresses reportedly did not provide control (Doggett et al. 2006) because the insects were able to move away from high temperature areas. Cost of the necessary equipment, the energy requirements, treatment duration, and other difficulties related to commercially available whole room and building heat treatments have created the need for an alternative localized heat treatment for the control of arthropod infestations.

This invention relates generally to a systematic method of heating objects to the lethal temperature of the infesting arthropod. Heating is a known method for controlling insects.

A method to heat entire structures is disclosed in U.S. Pat. No. 4,817,329. Generally, a region of the structure was subjected to hot gases for a sufficient time period to raise the host material temperature to the desired level and maintain the temperature until the insects perished. This heat treatment could be directed under ground. The entire structure was encased in insulation matt. This heating system was very costly, laborious and not economically feasible.

A later U.S. Pat. No. 5,058,313 describes an apparatus that includes the inspection of a structural wooden member within a structural wall; isolating the wooden member infected with insects; then positioning heat producing devices next to the isolated wood member on the outside wall. The heat producing device was activated and the isolated wooden member was heated sufficiently to kill a large number of insects in the wooden member. After one location was heated, the device was deactivated and moved to another location. Both convective and infrared heating systems were utilized. This system treated areas of walls and floors. It was unsuitable for oddly shaped objects and pieces of furniture.

Still further U.S. Pat. No. 6,141,901 describes a system of pest control of heating the effected area to the lethal temperature for the pest and maintaining this temperature for at least eleven hours. The CFM exchanges required 3-5 air changes per hour. While the heated air introduced in the treatment zone was at least 200 F. This system requires hot air that could deform wood (170 F) and requires a long time period (11 hours).

Still further U.S. Pat. No. 6,327,812 B1 discloses a system where ingress ducts are installed in windows and hot gas including ozone is pumped into the structure. Monitor probes are placed in strategic areas of the structure and the building's temperature is monitored. Exhaust gas from the structure is filtered to remove any organism remains. This system requires the heating of the entire structure at a high cost.

U.S. Pat. No. 6,892,491 B2 is a continuation of U.S. Pat. No. 6,327,812. Once again the entire structure is heated to up to 400 F. The main difference from the previous patent is that a negative pressure is created in the enclosure and the heated air carrying the harmful substances is passed through a filter to remove the harmful substances. This time the apparatus heats an entire structure under vacuum conditions at very high temperatures. U.S. Pat. No. 7,690,148 B2 is a continuation of U.S. Pat. No. 6,892,491. It is the same process except it includes the use for pests.

SUMMARY OF THE INVENTION

Among the several objects and features of the present invention may be noted the provision of a system to heat arthropod infested objects to the fatal temperature of the arthropod Object: Usable for the destruction of bed bugs and other arthropods. The use of a double layer of double reflective material that may cover the individual item such as a bed or furniture, to be treated with heat for the termination of pests, or a living room full of furniture.

Object: To provide a structured shelter that may be easily assembled from its miscellaneous components to an erected canopy that may be applied over a bed or other furniture that may be treated.

Object: To provide a means of treating for termination of bed bugs with out requiring the sealing off of a building or room while achieving its beneficial results when treating just a single bed or other items of furniture.

Object: The device is totally portable.

Object: No Filter or egress ducts are needed in this device to achieve successful termination of arthropods.

Object: The roofing structure for the support system consists of non metallic lateral rails and longitudinal rails that when assembled is elevated above the ground with inclined rails.

Object: A bottom reflective material may be applied to the floor, this bottom insulating layer is needed for hardwood floors, and floors suspended above crawlspaces and slabs. The insulation is not necessary for direct slabs, solid floors, and carpeted floors.

Object: The roofing structure for the support system also consists of non-metallic lateral rails, and a longitudinal rope and tube system, to provide for support in the upper reaches of the structure.

Object: This system consists of placing double reflective insulating material on the floor. Setting the arthropod infected objects on top of an insulating material, this bottom insulating layer is needed for hardwood floors and floors for the carpeted areas, and for other slabbed floors. The provision for setting area heaters at two opposite corners adjacent to the arthropod infested objects. The provision for placing a fan behind each heater so that the air blows through the area heaters. Thermocouples are inserted at strategic locations in the arthropod infested objects to determine the heating end point. A support structure is installed around the arthropod infested objects. Then a reflective canopy is installed under and around the inside of the support structure. The inner canopy consists of two side panels. Each panel has a hook tape border on one end and a loop tape border on the other end on the opposite side of the panel. Each side panel is wrapped on the inside of the support structure. The loop end is secured to the hook end so that no tape is exposed to the arthropod infested objects. The top end of these panels has hook tape along the horizontal border. To secure the top panel, the side panels' top hook tape bends horizontally. A top panel, which has a loop tape border on the underside, is secured to the top. The top panel is secured to the side panel by attaching the loop tape of the top to the hook tape on the side. In other words, the Velcro style of tape, which may include the hook and pile or loop type of connectors, one may be attached to the vertical supports of the side panels and end panels, and the other may connect with the inner panel itself, in order to provide means for securement of the reflective inner panel to its various support structures, during assembly. Thus a square or rectangular box is formed. The device could be made in the shape of a circle or diamond, quadrangle, pentagon, hexagon, septagon, octagon, and any other polygonal structure. To complete the installation, two outer reflective panels are surrounded around the support structure. The outer reflective panels are constructed in the same manner as the inner reflective panels except, protective cloth is adhered to the top side of the top and the outside of the side panels.

Object: The inclined rails forming the roofing structure for the system are shock corded, or its structural tubes are held together by a bungee cord type of cord system, to provide perimeter support for the poles and tubes that allow select components of the structure to be disassembled, but held together by elastic cord, to facilitate the ease of assembly from prompt usage, as needed.

Object: The protective cloth is certified as flame retardant according to standards developed by the National Fire Protection Associatkin (NFPA). The standard that applies is the NFPA 701 (Small Scale) Standard Methods of Fire Tests for Flame Propagation of Textiles and Films. The NFPA 701 (Small Scale) testing measures the ignition resistance of a fabric after it is exposed to a flame for 12 seconds. The flame, char length and flaming residue are recorded. This protective fabric has met the following criteria:
1. An after flame of less than 2 seconds.
2. A chair length of less than 6.5".
3. The specimen does not continue to flame after reaching the floor of the test chamber.

The protective cloth passed the Wyzenbeck Test for abrasion. This fabric does not show "noticeable wear" until the material has endured 15,000-30,000 cycles or double rubs in both the warp and filling directions.

Object: The support structure can alternatively include flexible hinges, at the ends of its various tubes, in the top structure for the device, and these flexible hinges are also provided to create an inspection port for ease of viewing into the interior of the tent, during its usage. This also provides for inspection during installation, and usage, in addition to subsequent to usage, during a system treatment. The support structure has an expansion area where the size can be increased or decreased, as necessary.

Object: To do the actual pest elimination, the heaters and the fans are activated. The temperature is monitored until the objects are heated to the fatal temperature of the arthropods. For bed bugs, the temperature is 122 degrees F. or slightly more. All of the thermocouples must be above this temperature for over 30 minutes to achieve success. Preferably the upper temperature generated will not need to exceed 140°.

Object: The electrical requirements are a heater and fan pair must be connected to one 20 amp circuit that has 120 Volts 60 Hertz. The second pairing of heater and fan must be connected to a separate 20 amp circuit that has 120 Volts 60 Hertz. The system does not require outside electrical generators to power the equipment.

Object: The reflective material is composed of two 96% reflective layers of an aluminized compound bonded to two internal layers of heavy gauge polymer bubbles. The fabric portion of the reflective material may be polyester, which is inherently fire resistant, and has a high melting point. That material will be laminated to the reflective layers, as just described. It has an emissivity of only 4%. The material has a Class A/Class 1 Fire rating meeting all fire and smoke safety requirements of federal, state, and local building codes (Satisfies UL 723, NFPA 255, and UBC 42-1). It has also been tested according to the American Society for Testing and Materials Standard E84 (ASTM84). This aluminum-polymer material will not disintegrate until heated to 1600 degrees F. It's operating environments range for −60 degrees to 180 degrees F.

Object: An alternative design for the top. It includes reclining poles that are secured by floor non-metallic ridge poles that are connected to form a square. Non-metallic connectors are slid onto the poles. These poles may be tubes, formed of polycarbonate, which exhibits little expansion until a temperature of approximately 230 degrees F. is encountered. The ridge poles for the system are then suspended by connecting the reclining poles to them. To support the top laterally, non-metallic tubes are secured to the top of the canopy with the loop and hook type tape. This is Velcro. Longitudinally, fire retardant line is secured to the top horizontal pole of a side panel. The line traverses over the top ridge pole then through a non-metallic tube that is covered with loop tape. This tube is secured to the inner canopy top with loop and hook tape, as aforesaid. Then, the line traverses over a lateral pole then through two additional tubes of the previous design. The line continues this method of traversing through tubes and over poles until reaching the opposite side and is secured to the opposing top side panel and its horizontal rail.

Other objects and purposes for the disclosure of this invention may occur to those skilled in the art upon review of the invention as summarized herein, and upon undertaking a study of the description of its preferred embodiment.

DESCRIPTION OF THE DRAWINGS

In referring to the drawings:

FIG. 19: Shows how shelving may be applied within the heat chamber for stacking of miscellaneous items to be treated, such as pillows, mattresses, luggage, and any other type of item that requires the elimination of bed bugs, or the like.

Corresponding reference characters indicate corresponding parts throughout the several views of the drawings.

DESCRIPTION OF THE PREFERRED EMBODIMENT

Figure 1:
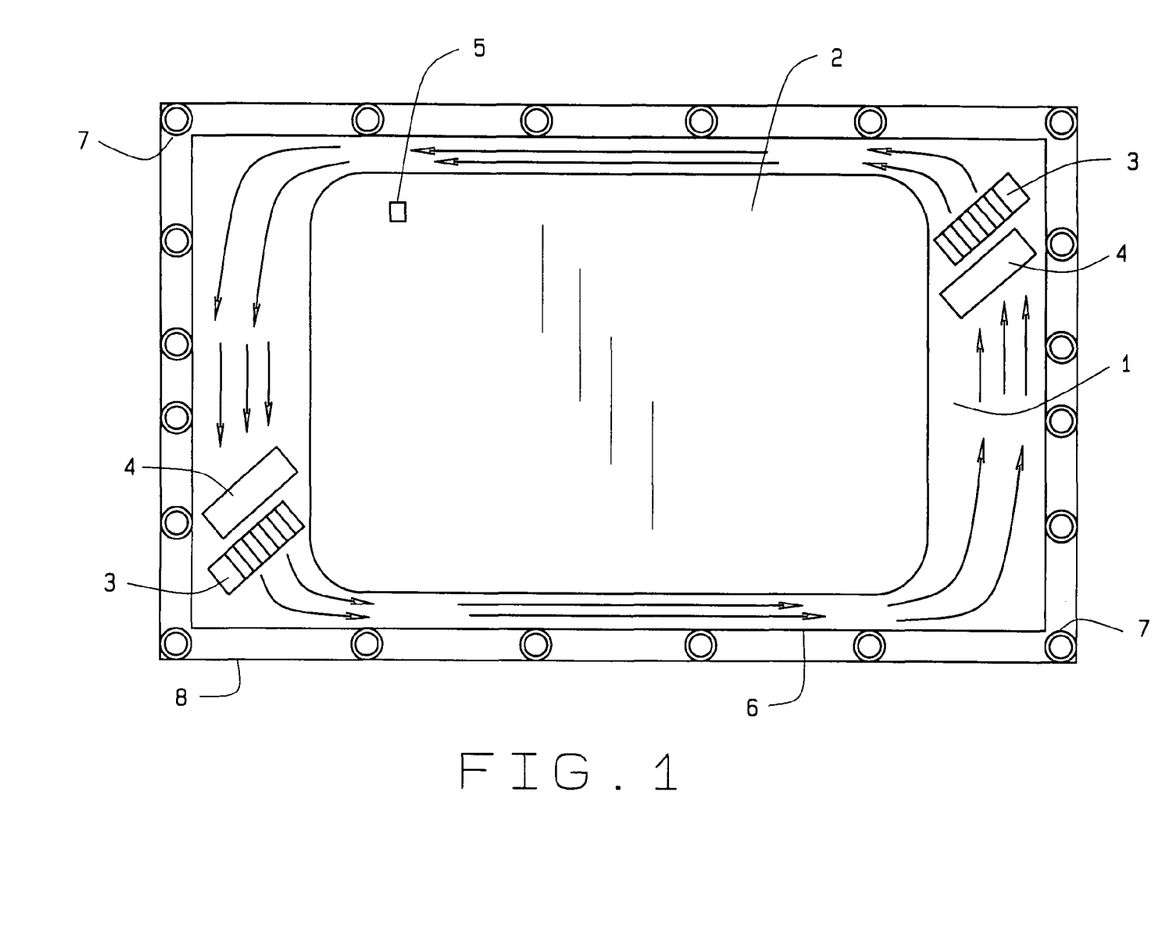
FIG. 1: Bed Bug Baker Heating Components as assembled.

Referring now to the drawings, FIG. 1 shows the components of an arthropod heating system which consists of 1 double reflective insulation floor cover, 2 arthropod infested building contents, such as a bed, 3 portable heaters, 4 portable fans, 5 thermocouples or thermometers, 6 double reflective insulating inner canopy, 7 non metallic support structure, 8 double reflective insulating outer canopy.

Figure 2:
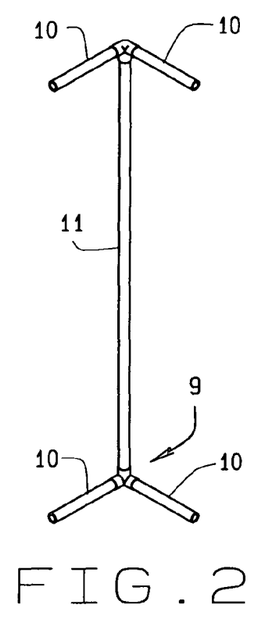
FIG. 2: Support Structure Components-Corners.
Figure 3:
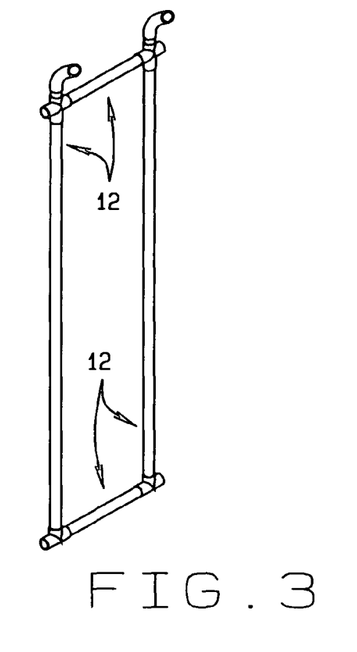
FIG. 3: Support Structure Components-Side Panel.
Figure 4:
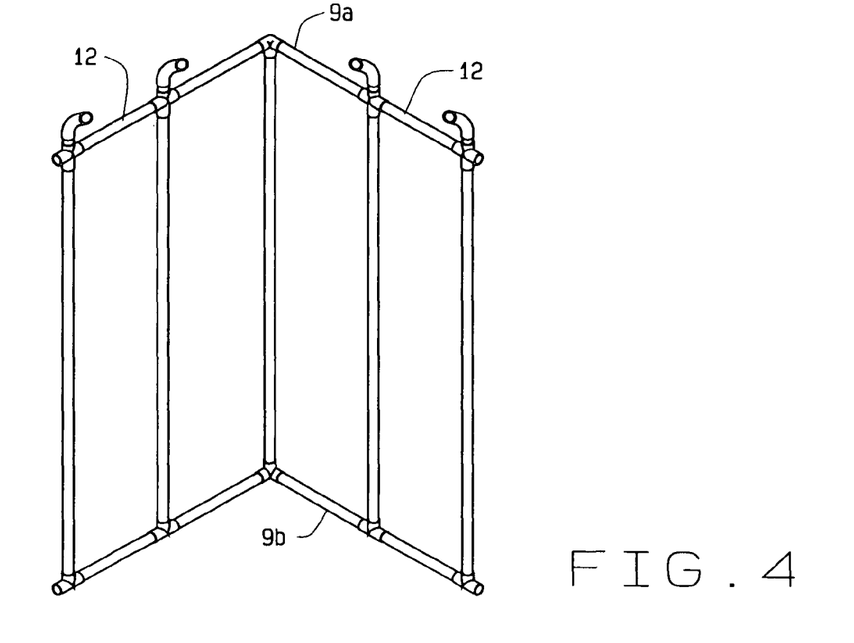
FIG. 4: Support Structure Components-Corner Connected to Side Panels.
Figure 5:
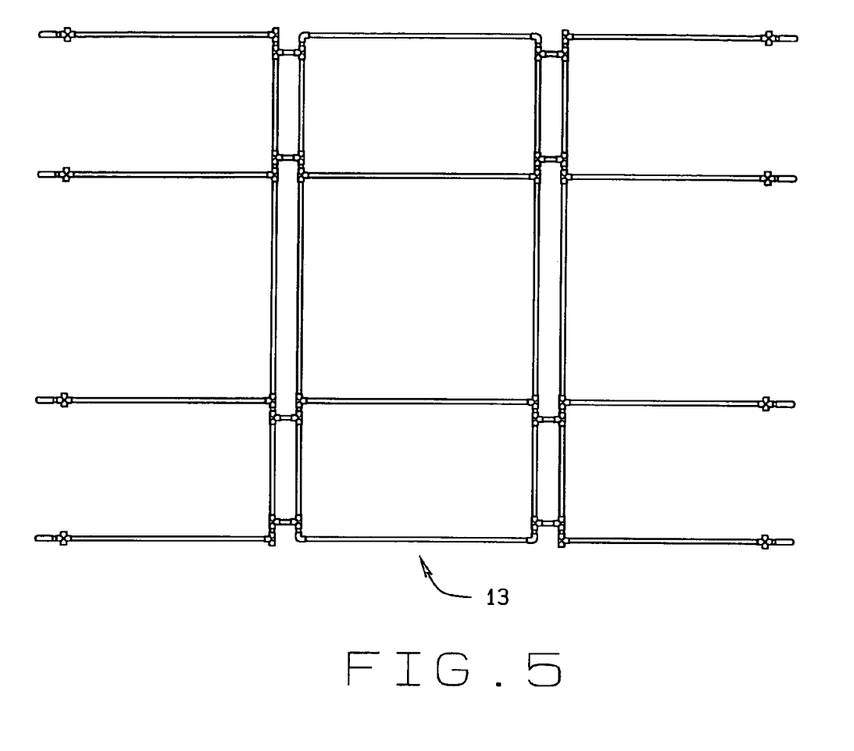
FIG. 5: Support Structure Components-Top lateral and longitudinal rails with 4 hinges.
Figure 6:
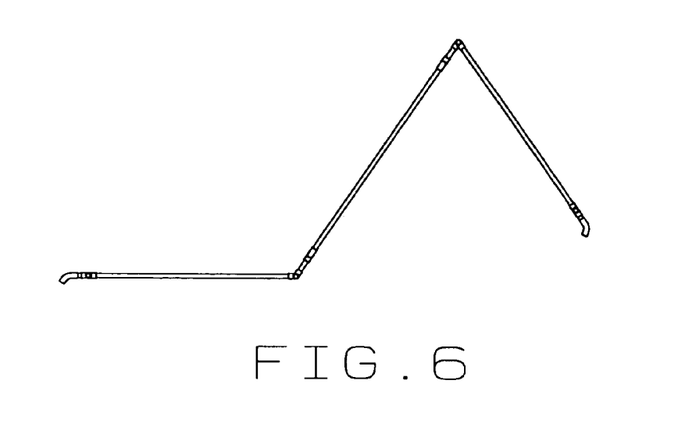
FIG. 6: The top hinges in folded position.
Figure 7:
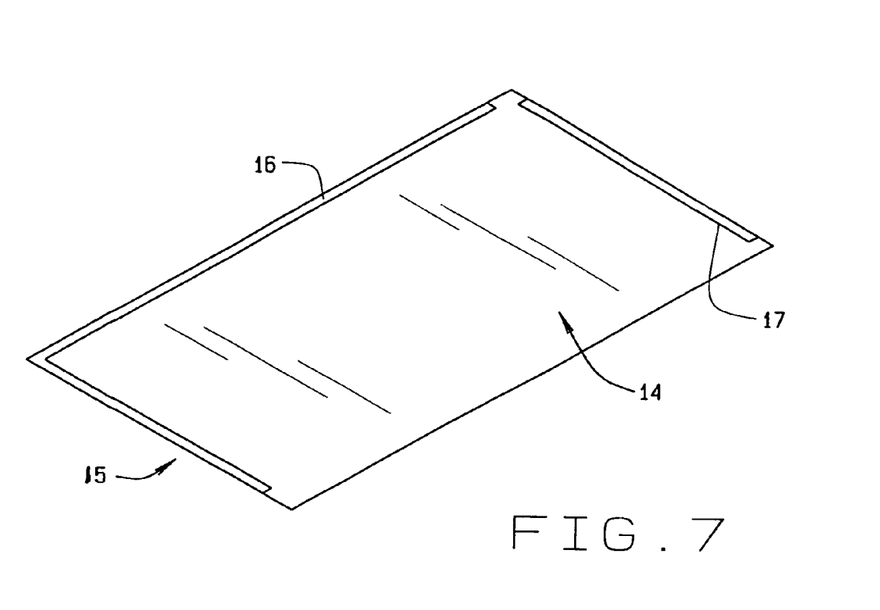
FIG. 7: The Inner Canopy Top and The lower Side.
Figure 13:
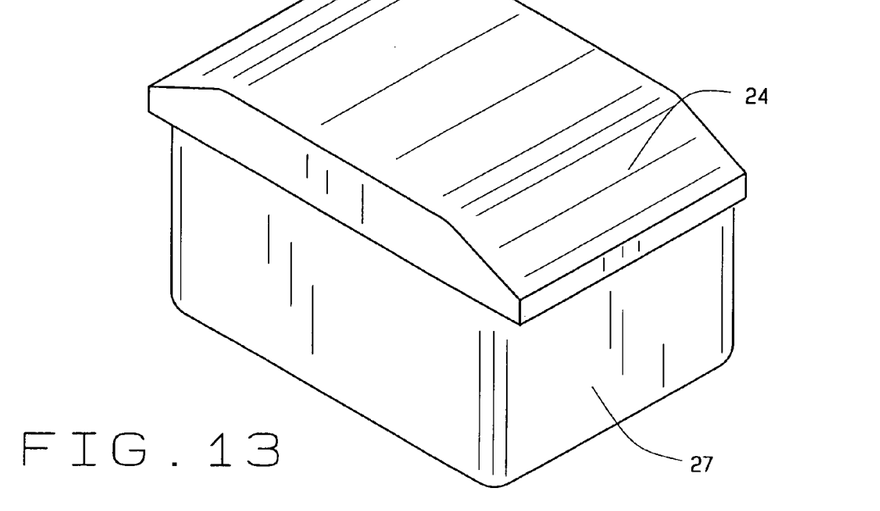
FIG. 13: Outer Canopy Top Placed over Support Structure and secured to Outer Canopy Perimeter.

To construct the non-metallic support structure, FIG. 2, the corners 9 are formed by securing lateral poles 10 to corner poles 11. The side panel 12 consists of lateral rails and longitudinal rails assembled into a rectangle or square in FIG. 3. PVC or polycarbonate tubes may be used for these structures. The main corners 9b are assembled by connecting the corners 9 to the side panels 12 in FIG. 4. The support structure top 13 in FIG. 5 consists of four hinges connected to lateral and longitudinal rails or, the top may be solid and unhinged. In FIG. 6, the hinges are shown in the folded position. In smaller units the four hinges are not present. In FIG. 7, the Inner Canopy perimeter panel 14 has hook tape borders on the end 15 and the top 16 on the outer side. Loop tape 17 borders the opposite end on the other side of the panels. For the outer canopy, the perimeter panel is constructed with the hook and loop tapes in the same locations as the inner canopy. These loop tape 17, as noted, are provided on the underside of the canopy panel 14, to make them available for interconnection with other parts of the structure. However, fire retardant protective cloth is fastened to the outside of the perimeter panel in FIG. 13. In order to facilitate the usage, and the dismantling for storage, of these various support structures, there may be elastic cord provided within each of the sections, and which may be linked together, so that when the sections are separated, such as the lateral poles 10 from the corner poles 11, etc., they will be held together by the elastic cords, to facilitate storage.

Figure 8:
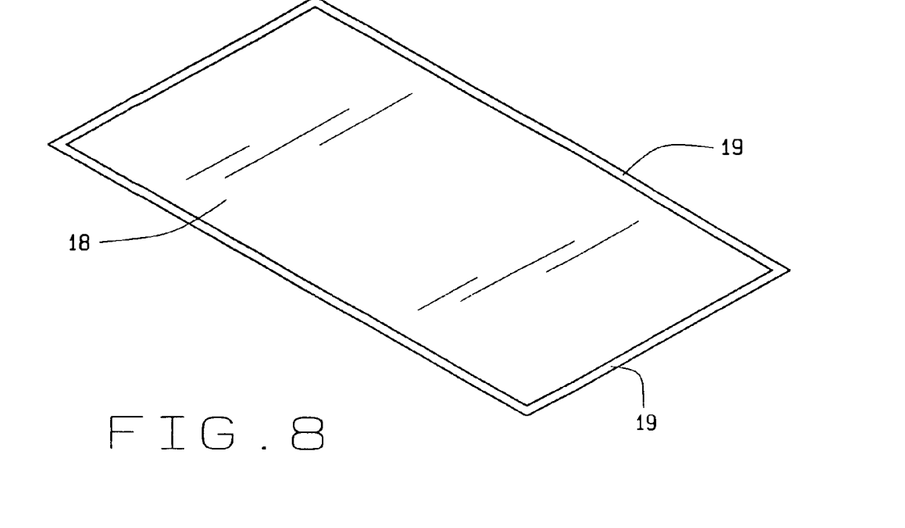
FIG. 8: The Inner Canopy Side Panel.
Figure 9:
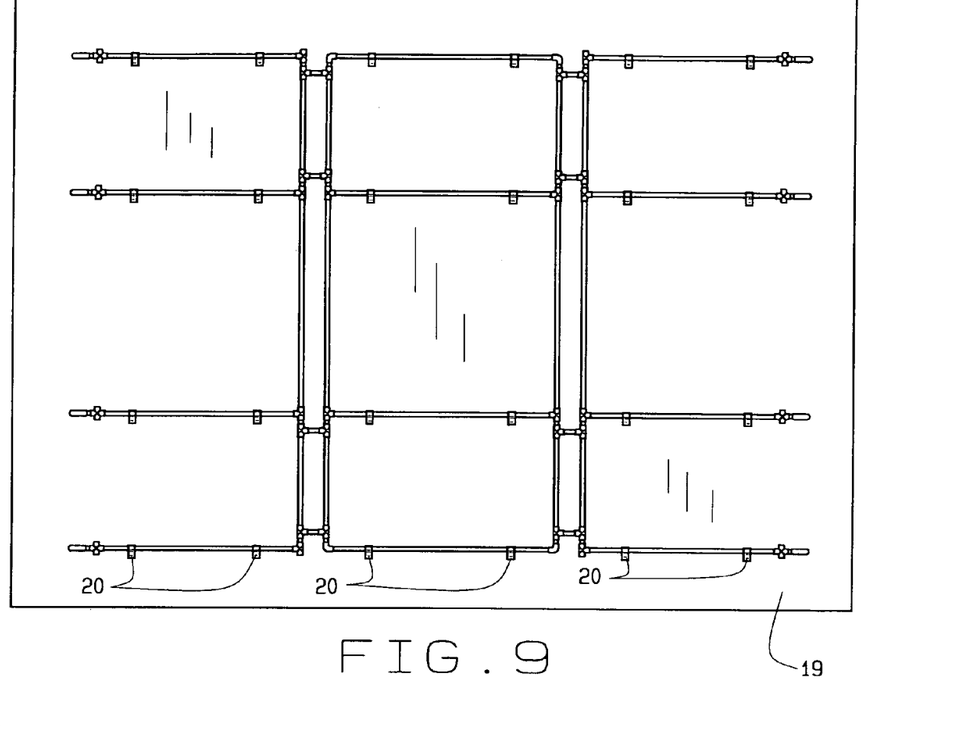
FIG. 9: The support Structure top installed over the Inner Canopy Top.

The underside of the inner canopy top 18 in FIG. 8 has loop tape 19 secured to the borders. This loop tape fastens to the hook tape 16 on the perimeter panel. The support structure top 13 in FIG. 9 is secured to the upper side 19 of the inner canopy top. Loop and hook 20 tape placements are utilized to attach the canopy top to the support structure top.

Figure 10:
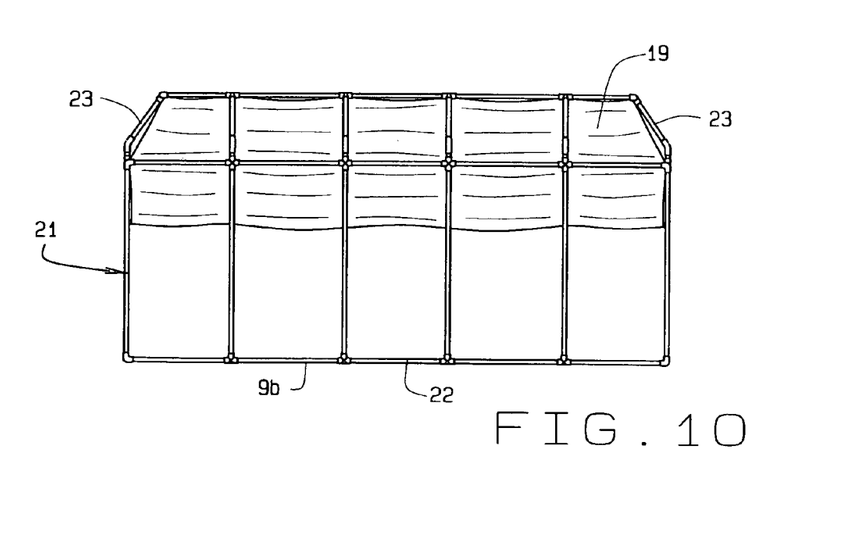
FIG. 10: The Support Structure top and Inner Canopy top installed onto Perimeter Support Structure.
Figure 11:
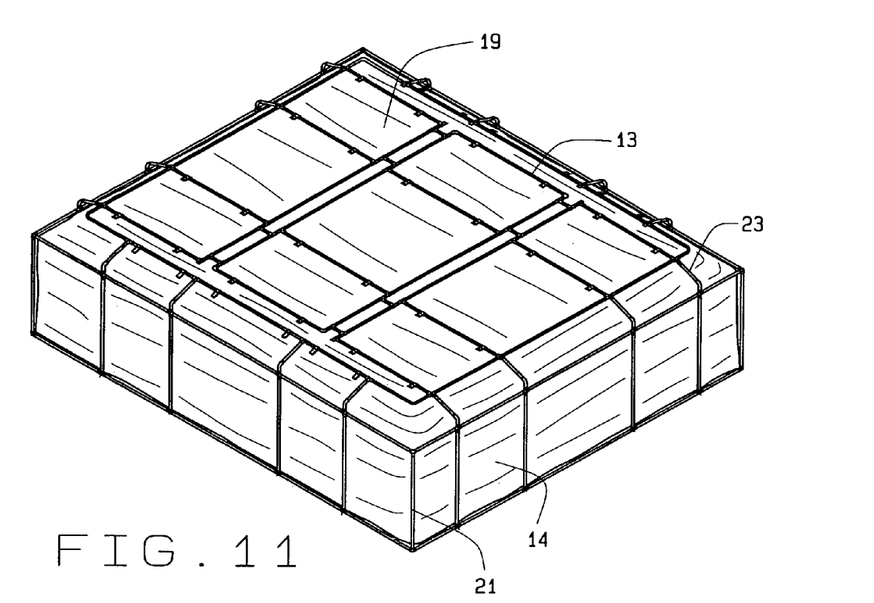
FIG. 11: The assembled apparatus.

In FIG. 10, the perimeter support structure 21 has been constructed by connecting the assembled corners 9b together with an expansion rail 22. After the Inner canopy top 19 has been secured to the support structure top 13, inclined rails 23 are placed on the perimeter support structure 21. Then the support structure top 13 canopy top 19 is connected to the reclining rails 23. To complete the inner canopy 23, the inner canopy perimeter panel 14 is threaded inside the support structure 21. The loop tape 19 on the inner canopy top 18 is attached to the hook tape 16 on top of the inner canopy side panel. This panel extends ½ the distance of the perimeter. A second canopy side panel is connected to the first inner canopy side panel by way of the hook tape at one end secured to the loop tape of the other. Once again the loop tape of the canopy top secures to the hook tape on the perimeter. See FIG. 11.

Figure 12:
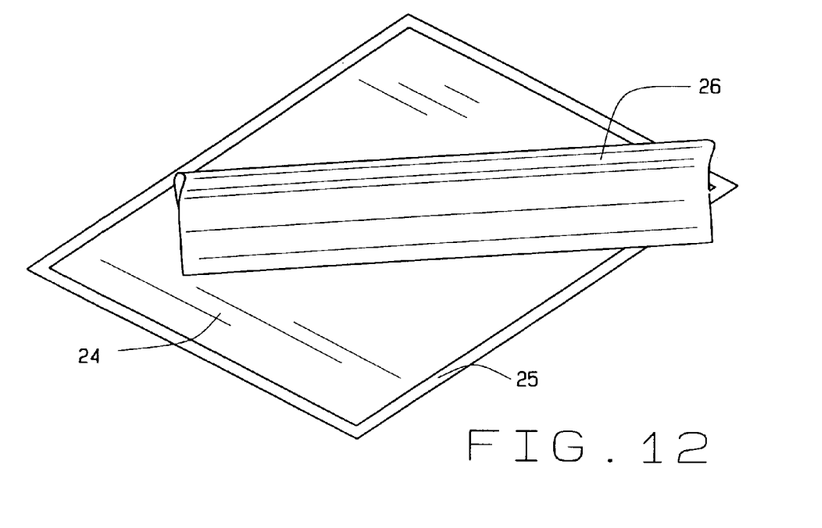
FIG. 12: Inner Canopy Perimeter Secured to Inner Canopy Top.

In FIG. 12, the outer canopy top 24 has loop tape 25 on the underside and protective cloth 26 on the upper side. The bed bug baker is completed in FIG. 13, by placing the outer canopy top 24 over the top of the support structure 13. Then the outer perimeter canopy 27 is wrapped around the outside of the perimeter support structure. Like the inner canopy, connecting the hook tape on the outer canopy perimeter is connected to the loop tape of the outer canopy top. As previously reviewed, the outer canopy top, and its protective cloth 26, will be adhered by means of Velcro to the reflective material provided interiorly thereof, or may connect to the outer top support structure of the invention.

Figure 14:
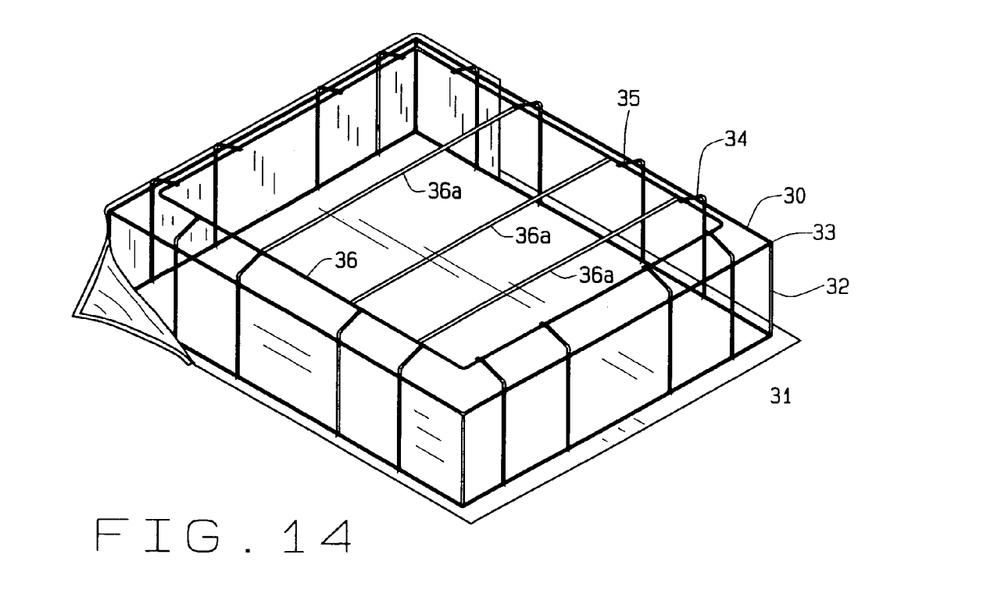
FIG. 14: Assembled substructure for the support structure for the forming heat chamber.

FIG. 14 shows the substructure for the support structure 30 for the forming canopy of this invention. As noted, this substructure may be rested upon an insulative pad 31, and this type of a pad may be used when the treatment is to be applied upon a hardwood floor, or where there may be a crawlspace beneath the canopy, and there is the desire to prevent the excessive leakage of heat, at least from the bottom of the structure, during its usage. As can be noted, the structure for this support structure includes a series of vertical tubes, as at 32, which connect by various connectors, as noted at 33, to form the tubes together into an assembled panel of square or rectangular sections, as noted. Then, the same integrated connectors provide for the extension of tubes 34 upwardly at an angle, where they connect with further connectors 35 in the assembly of the canopy. In addition, various tubes 36 may interconnect around the upper inner perimeter of the canopy, as can be noted. As previously explained, these tubes may be formed of a polycarbonate, or PVC, and therefore, are resistant to expansion when exposed to elevated temperatures, as can be understood. Furthermore, these cables 37 are designed for securement with the upper rails of the side and end panels, for the support structure, and then extend across the top longitudinal rods 36A, as to be explained. Thus, the entire structure 30 is assembled, as noted, to provide the substructure for the forming chamber. Then, side panels 38 are draped about the sides of the structure, and may be held in place by means of any type of fasteners, or Velcro connectors, to secure the side walls in place. In this substructure, of the support structure 30, as noted, there are a series of longitudinal rods 36A that extend across the top structure of the support structure 30, and these longitudinal rods or rails are used when the top is of the unhinged style.

Figure 15:
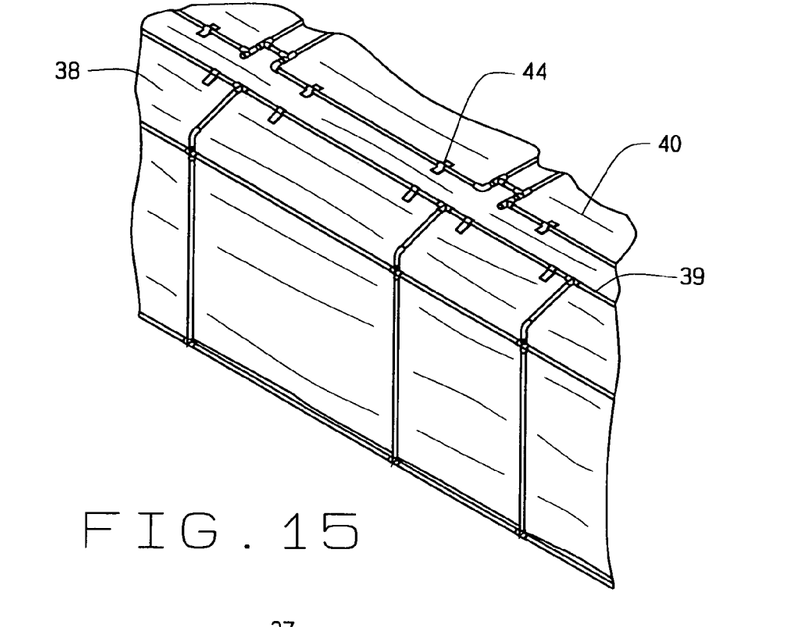
FIG. 15: Assembled partial heat chamber with side and top canopies secured in place.
Figure 16:
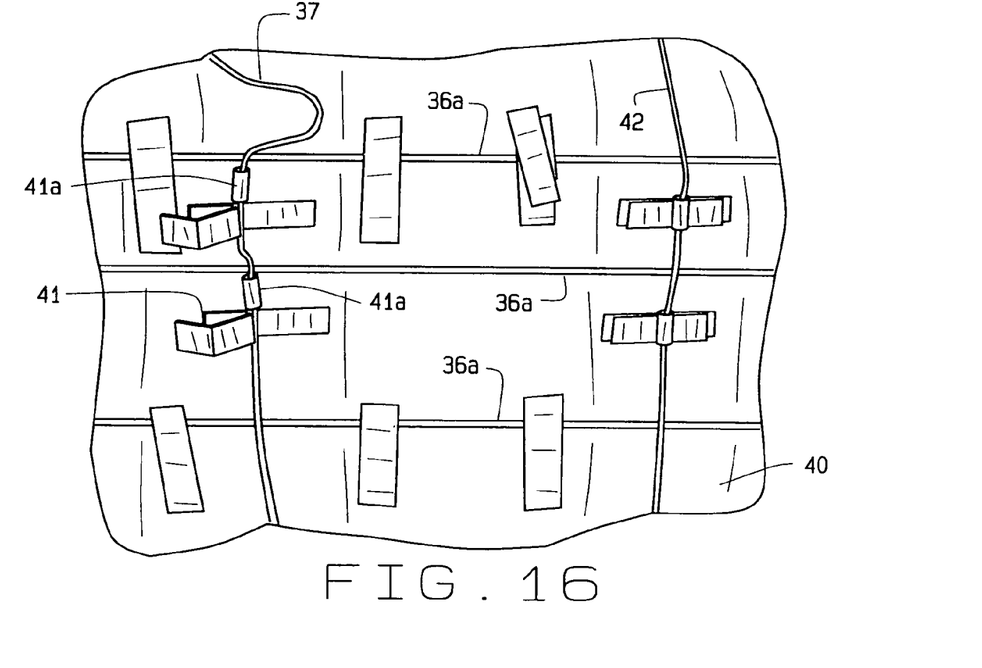
FIG. 16: Flexible cord used for securement and support of top canopy upon its support structure.

Then, as can be seen in FIG. 15, a series of lateral rods 39 are assembled across the top of the support structure, and it has secured there beneath, a top canopy insulative sheet, as noted at 40, as can also be seen in FIG. 16. There are a series of connecting means, such as Velcro, as noted at 41, that may secure to the lateral rods 39. In addition, to add further support to the retention of the top canopy in place, a series of flexible cables, as noted at 42, are connected to the structural supports of the side wall structure, as noted at 43 and are draped over the top of the upper canopy, and secured by fasteners, such as at 44, which may also be formed as a Velcro type of fastener, in order to secure the cables 42 in place, and keep the upper surface of the top canopy reasonably connected, to its upper structure, and particularly with respect to the lateral supports 39, as can be noted. The longitudinal rods 36A, of the top support structure, can be seen extending across, above the insulative sheet 40, and the reflective sheet or canopy can be secured by means of the various loop and hook tape holding placements 20, as previously explained. In addition, the connecting means 41, which may include a series of short tubes 41A, can secure the various cords 37, that extend the across the top of the support structure, perpendicularly arranged with respect to the longitudinal rods 36A, in order to provide full support for holding the reflective canopy within the roof structure, of the device.

Figure 17:
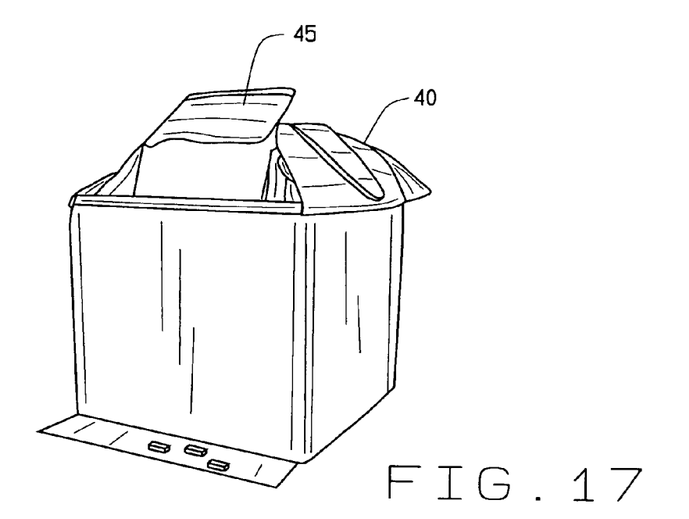
FIG. 17: A hinged porthole provided within the top canopy for visual inspection therein.

FIG. 17 shows how there may be formed into the upper canopy 40 a cover 45, and which may be hinged therewith, so it can be pivoted upwardly, to provide for a visual observance into the heat chamber, before, during, and after usage, to provide an observation port for determining the extent to treatment, and the degree of is success.

Figure 18:
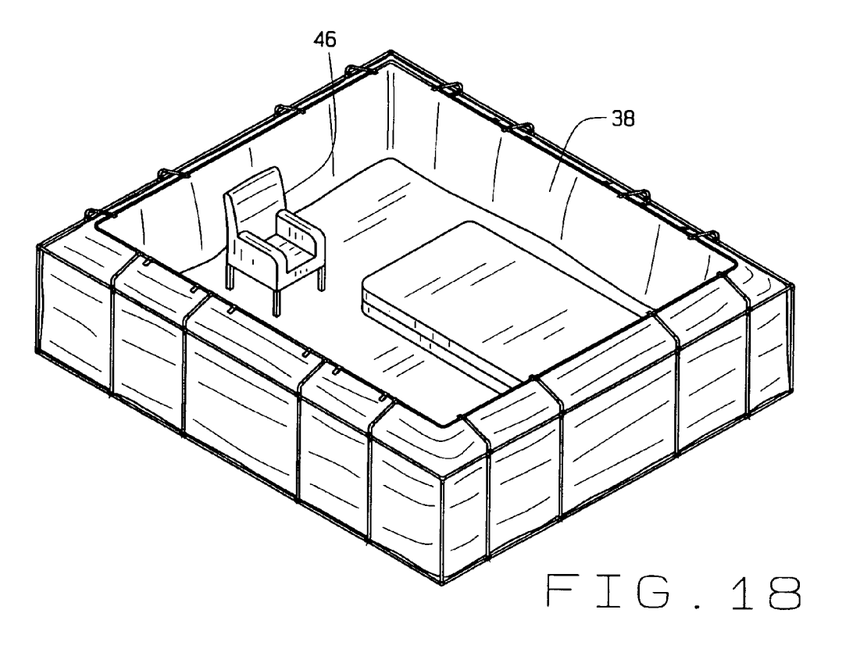
FIG. 18: The support structure, with side panels in place, before location of the top panel, and disclosing how furniture, chairs, mattresses, or other items to be treated or assembled therein.

FIG. 18 shows the heat chamber in partial assembly, with its side panels 38 in place, but before the top canopy has been located, and it shows how the chamber is assembled around various furniture, as can be noted at 46, as it is being assembled into the formation of its chamber, in preparation for the addition of heat, to provide for treatment of any infestations that may be upon the located furniture.

Figure 19:
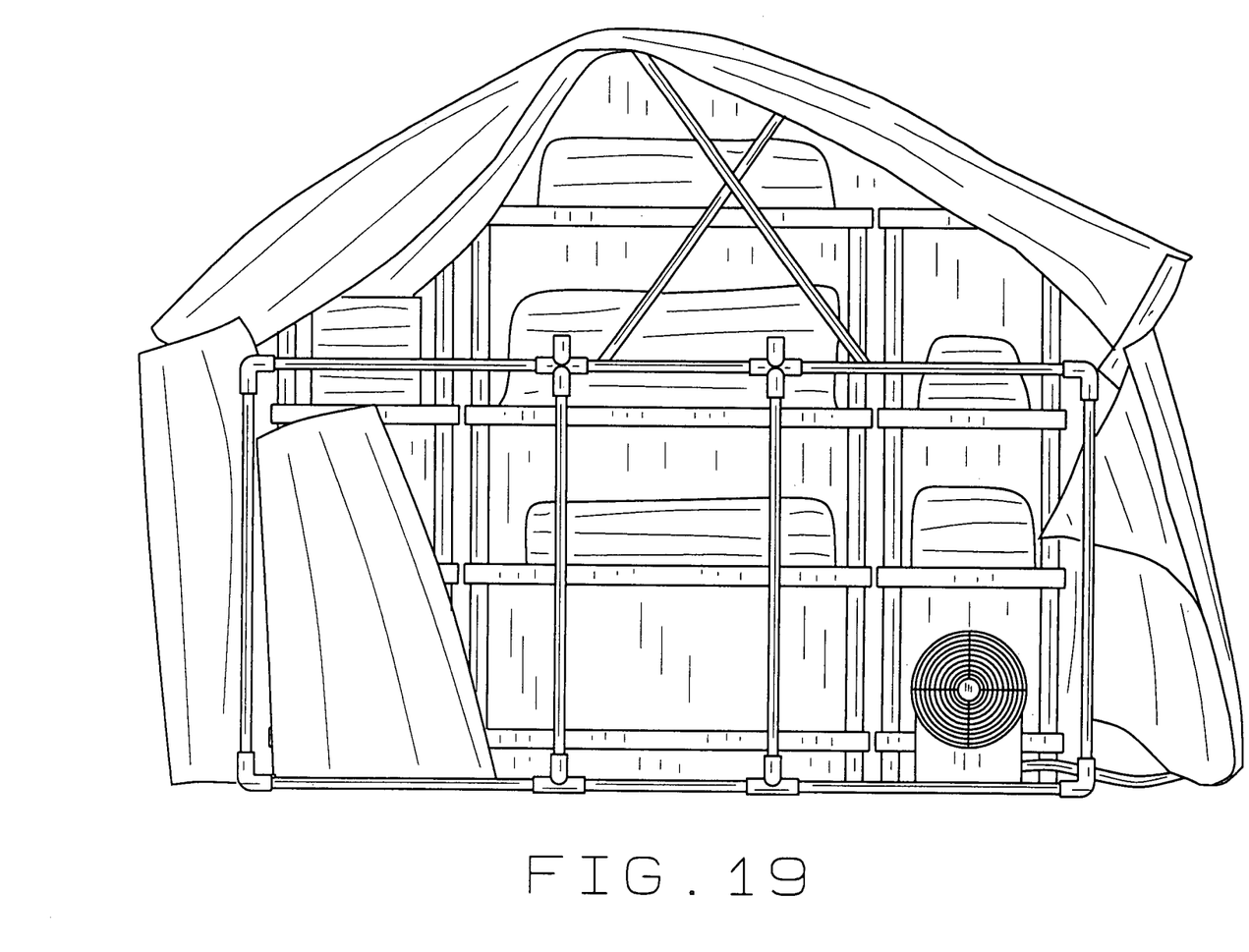

Other types of related structures may be envisioned for usage with the concept of this invention. For example, the tent, and its formed heat chamber, may be of a lesser size, to perform a smaller size tent, or perhaps a smaller bin, that can be assembled for holding other components, to be treated. Or, there may be bins or shelving that may located within the formed heat chamber, to hold smaller items to be treated, whether it be papers, a briefcase, or any other item, such as an item of clothing, that may have been exposed to bed bugs, or other infestations, such as when the owner has been on a business trip, vacation, or anywhere else where such exposure may occur. See also FIG. 19.

Variations or modifications to the subject matter of this invention may occur to those skilled in the art upon review of the summary of the invention as provided herein, and upon undertaking a study of the description of its preferred embodiment, in view of the drawings. The invention, as defined, is primarily set forth for illustrative purposes only. Such variations, if within the spirit of this invention, are intended to be encompassed within the scope of any claims to patent protection issuing upon this development.

We claim:

1. A system for the destruction of insects located upon individual items through the use of the application of heat, including a support structure, the support structure being formed of a series of lateral and longitudinal rails, interconnected together to provide for support of the system during its usage, an inner canopy applied within an interior of the support structure, and hooked onto its various rails during application, the inner canopy being formed of a double reflective insulating material that is applied both interiorly of the support structure along its top structure, and along its inner sides, a double reflective insulating material applied on a bottom of the support structure, to function as a floor therefore, an outer canopy provided exteriorly around the support structure, including a top panel, for application to the top structure of a roof for the system, and side panels that extend around outer sides of the structure, to function as a protective cover that is adhered to a top side and the outside of the side panels, at least one heater provided within the structure during its application, in proximity to the item being treated, to provide for the generation of heat to function as the means for termination of any insects during its application.

2. The system of claim 1 and including at least one circulating fan provided within the structure in proximity with the item being treated to provide for circulation of the heated air around the item during its treatment.

3. The system of claim 2 and including at least one thermocouple provided within the system to provide means for measuring the temperature being generated therein during application and operation of said system.

4. The system of claim 2 wherein each of the double reflective insulating materials of the inner canopy includes an inner and outer layer of aluminized material, and having arranged intermediate thereof an interior layer of polymer bubbles.

5. The system of claim 1 wherein at least one of the heater provided at opposite corners of the structure during its application, and at least one circulating fan provided within the structure in proximity with each heater to disseminate the generated heat upon the item being treated during application.

6. The system of claim 1 wherein the double reflective insulating material that is applied interiorly of the support structure comprises metalized reflective insulating material.

7. The system of claim 1 wherein said inner canopy comprising both its side panels and its top panel are connected to the support structure of the system.

8. The system of claim 7 wherein said means for connecting the side panels and the top panel of the inner canopy comprising hook and pile connectors that secure with said support structure.

9. The system of claim 1 and including a series of inclined rails, said inclined rails interconnecting between the lateral and longitudinal rails of said support structure to the top structure in the formation of the said structure for the system.

10. The system of claim 9 wherein said outer canopy provided exteriorly upon the top panel, side panels, and end panels for the support structure, to aid in the retention of heat within the system during its operation for destruction of insects located upon the individual items contained within said support structure.

11. The system of claim 9 wherein said inner canopy includes a series of perimeter panels that engage the incline rails to provide a complete inner canopy of double reflective insulating material as applied interiorly of said support structure during its usage.

12. The system of claim 1 wherein said top panel is an integrally formed series of longitudinal rails that provide support for the top of the support structure for supporting the top panel of the outer canopy during its installation and usage.

13. The system of claim 12 wherein said longitudinal rails of the top panel are hingedly connected together, to allow for their folding for storage during non-usage.

14. The system of claim 1 and including said reflective insulating material applied on the bottom of the support structure functions as a floor, and the support structure resting on said floor during its application.

15. The system of claim 1 including a series of flexible cables connecting with the top panel and securing with the top of the support structure for arrangement of the insulating material top panel to said support structure during its assembly and usage.

16. The system of claim 1 wherein said top panel includes a hinged segment that provides for its opening for viewing the content of the items contained within the support structure during their treatment.

17. A system for the destruction of insects located upon individual items through the use of the application of heat, including a support structure, the support structure being formed of a series of lateral and longitudinal rails, interconnected together to provide for support of the system during its usage, an inner canopy applied within an interior of the support structure, and hooked onto its various rails during application, the inner canopy being formed of a reflective insulating material that is applied both interiorly of the support structure along its top structure, and along its inner sides of the support structure, a reflective insulating material applied on a bottom of the support structure, to function as a floor therefore, an outer canopy provided exteriorly around the support structure, including a top panel, for application to the top structure of a roof for the system, and side panels that extend around outer sides of the structure, to function as a protective cover that is adhered to a top side and the outside of the side panels, at least one heater provided within the structure during its application, in proximity to the item being treated, to provide for the generation of heat to function as the means for termination of any insects during its application.

18. The system of claim 17 wherein the top structure of the roof system includes a series of longitudinal rods, that extend between the various upper rails of the support structure, and a series of cables extending perpendicularly to said longitudinal rods, and connecting therewith, to secure the reflective top panel interiorly but to the longitudinal rods of said support structure.

19. The system of claim 18 and including a series of hook and pile connectors securing the reflective top panel and the various cables to the longitudinal rods of the formed roof structure.

20. The system of claim 17 and including a series the locating of shelving within the system support structure to contain the various items to be treated during operation.

* * * * *